May 13, 1958 L. WERNER ET AL 2,834,560
FLUID PROPELLED AIRCRAFT
Filed Nov. 20, 1956 2 Sheets-Sheet 1
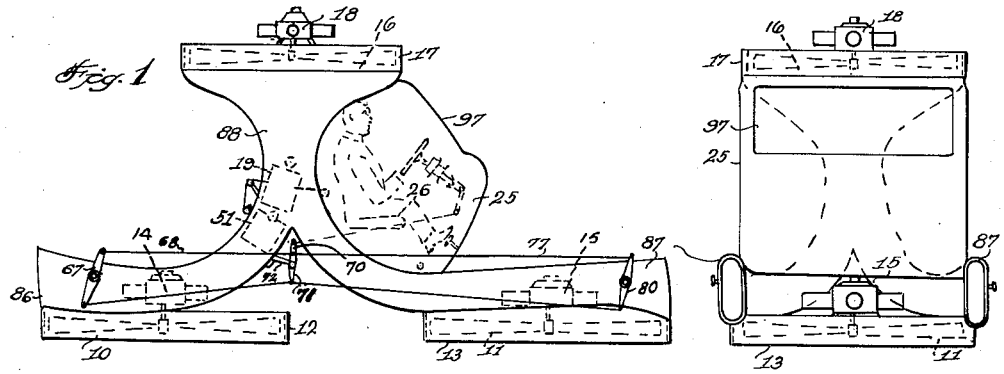
Fig. 1.
Fig. 2.
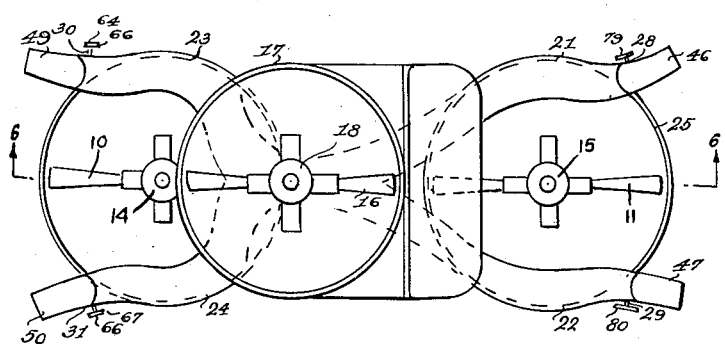
Fig. 3.
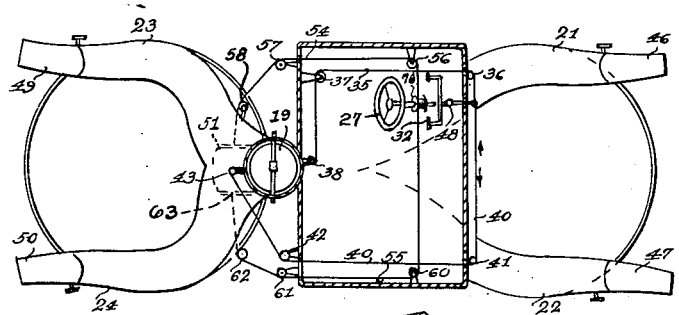
Fig. 4.
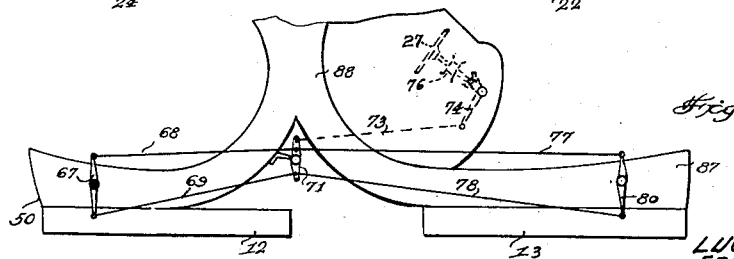
Fig. 5.
INVENTORS
LUCZLO WERNER &
FRANK WERNER
BY Victor J. Evans & Co.
ATTORNEYS May 13, 1958   L. WERNER ET AL   2,834,560
FLUID PROPELLED AIRCRAFT
Filed Nov. 20, 1956   2 Sheets-Sheet 2
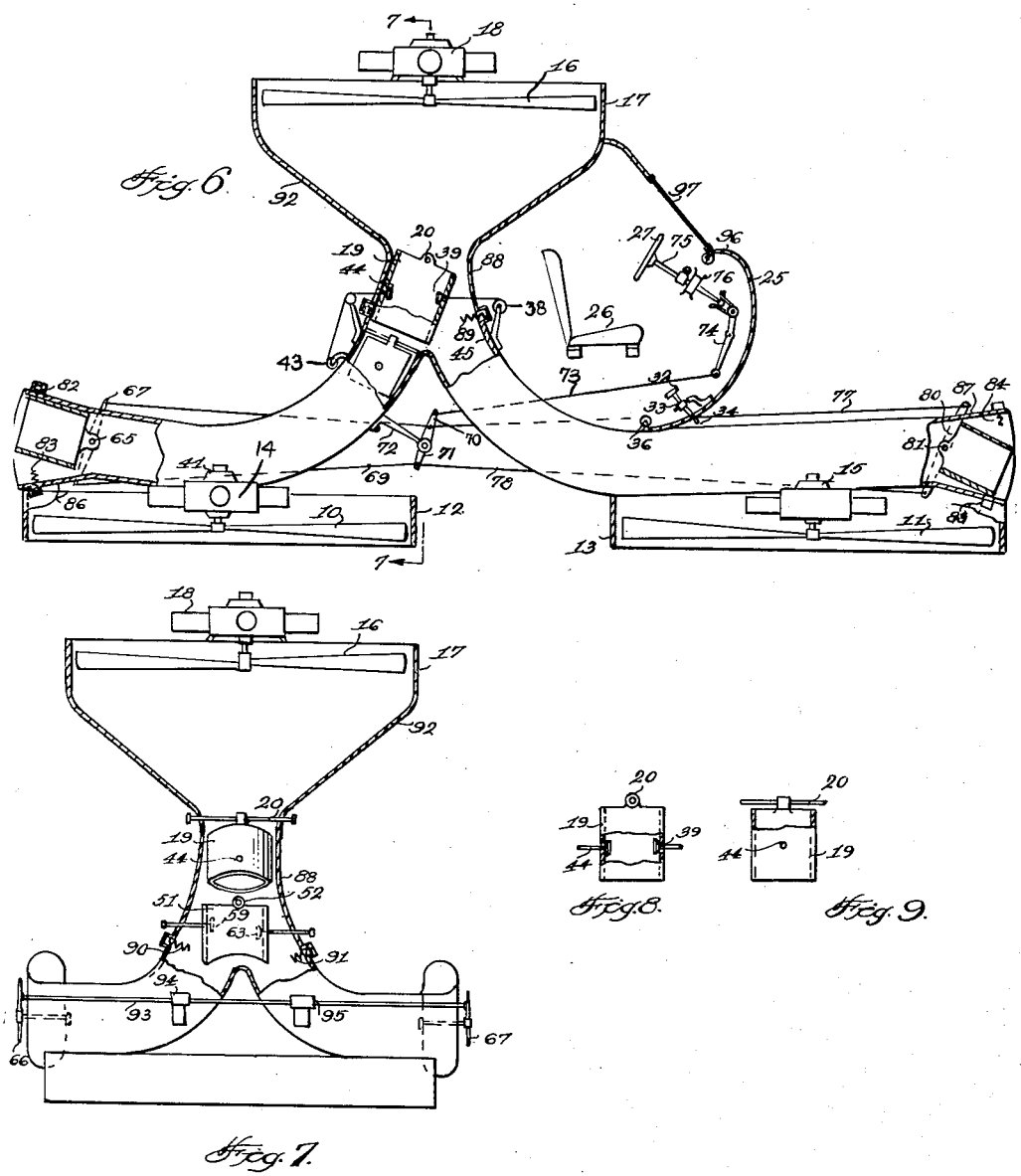
INVENTORS
LUCZLO WERNER &
FRANK WERNER
BY Victor J. Evans & Co.
ATTORNEYS

United States Patent Office 2,834,560
Patented May 13, 1958

2,834,560

FLUID PROPELLED AIRCRAFT

Luczlo Werner and Frank Werner, Irvington, N. J.

Application November 20, 1956, Serial No. 623,346

1 Claim. (Cl. 244—23)

This invention relates to aircraft and particularly power driven gliders, and in particular the device of this invention includes a pair of horizontally disposed propellers, such as used in helicopters and the like and an additional horizontally disposed propeller positioned to compress and supply compressed air to a plurality of tubes extended to four corners of the vehicle wherein manually actuated valve elements control the flow of air to the tubes whereby the vehicle may travel in a horizontally disposed plane or in upwardly inclined or downwardly inclined planes or make turns to either the right or left.

The purpose of this invention is to provide a glider type of vehicle whereby an operator may glide over the ground and in spaced relation to the ground and wherein the direction of travel and also the elevation of the vehicle are controlled by air currents.

Various types of power driven gliders have been provided, however, such devices are built for speed and particularly for horizontal travel, whereas for individual use it is desired to provide an aircraft of the helicopter type wherein the operator has absolute control of the vehicle and wherein the vehicle is controlled by compressed air traveling through ducts thereof.

With this thought in mind this invention contemplates a frame including a pair of horizontally positioned propellers with a third propeller positioned in a superstructure and with a cockpit positioned between the propellers and having control means for directing air under pressure to the four corners of the aircraft.

The object of this invention is, therefore, to provide an aircraft that is retained in elevated position with horizontally disposed propellers and that is controlled and maneuvered by air from a third propeller positioned to compress the air and drive the compressed air through tubes or ducts extended from the center to the four corners of the device.

Another object of the invention is to provide aircraft of the helicopter type wherein an operator in a cockpit may steer, or raise or lower the aircraft from his position on a seat in the cockpit.

A further object of the invention is to provide aircraft of the helicopter type in which the device is elevated by horizontally disposed propellers and wherein movements of the device are controlled by a third horizontally disposed propeller which discharges air into tubes leading from the propeller to the four corners of the vehicle.

A still further object of the invention is to provide an aircraft having a plurality of horizontally disposed propellers, such as the propellers used in helicopters and the like with two of the propellers positioned to elevate the aircraft and a third propeller positioned to discharge air under pressure to points at the front and rear of the aircraft and in which the flow of air from the propellers is controlled from a cockpit with a steering wheel and foot control lever in which the device is of a relatively simple and economical construction.

With these and other objects and advantages in view the invention embodies a pair of horizontally disposed lower propellers, preferably driven by individual engines, a horizontally disposed upper propeller also driven by an individual engine with the upper propeller positioned to drive air under pressure through tubes to corners of the aircraft and with swinging valves actuated from a cockpit between the propellers for directing air under pressure through tubes to corners at the front and rear of the aircraft.

Other features and advantages of the invention will appear from the following description taken in connection with drawings, wherein:

Figure 1 is a side elevational view of the improved aircraft showing an operator positioned on a seat in a cockpit thereof.

Figure 2 is an end elevational view of the aircraft with the parts as shown in Fig. 1.

Figure 3 is a plan view showing the relative positions of the upper and lower propellers of the aircraft.

Figure 4 is a sectional plan through the aircraft with the upper propeller and associated parts thereof omitted, and showing, in particular, suitable controls for directing the flow of air from the upper propeller.

Figure 5 is a side elevational view of the aircraft with parts broken away and parts omitted showing a steering wheel control for valve elements at the ends of horizontally disposed tubes extended from the upper propeller.

Figure 6 is a longitudinal section through the aircraft taken on line 6—6 of Fig. 3 with the parts shown on an enlarged scale, also illustrating the controls for compressed air from the upper propeller.

Figure 7 is a cross section through the aircraft taken on line 7—7 of Fig. 6 also showing the valve elements for directing the flow of air from the upper propeller, selectively, forwardly or rearwardly.

Figure 8 is a side elevational view of a swinging tube or valve element for directing the flow of compressed air from the upper propeller.

Figure 9 is a front elevational view of the valve element shown in Fig. 8.

Referring now to the drawings wherein like reference characters denote corresponding parts the improved glide mobile of this invention includes horizontally disposed propellers 10 and 11 positioned in cylindrical casings 12 and 13, respectively and actuated by engines 14 and 15, an upper horizontally disposed propeller 16 positioned in a casing 17 and actuated by an engine 18, a swinging valve element 19 pivotally mounted on a pin 20 and positioned to receive compressed air from the propeller 16 and guide the air through tubes 21 and 22 toward the front of the machine and through tubes 23 and 24 toward the rear of the machine, and a cockpit 25 having a seat 26 therein and having a steering wheel 27 for controlling valve elements 28 and 29 at the forward ends of the tubes 21 and 22, and 30 and 31 at the extended ends of the tubes 23 and 24, respectively, and a foot control 32 for actuating the valve element or cylinder 19.

The pedal 32, which is slidably mounted in a bearing 33 is connected, at the point 34 to a cable 35 which extends over pulleys 36 and 37 and from the pulley 37 inwardly toward the center being trained over a pulley 38, as shown in Fig. 4, from which the cable extends to a connection 39 on the forward side of the tubular valve member 19. The foot pedal 32 is also connected by a cable 40 in the opposite side of the valve member 19, the cable 40 being trained over pulleys 41 and 42 at the side and extending inwardly to a pulley 43 from which the cable extends to a fastening element 44 on the rear side of the member 19. Upon downward movement of the foot pedal 32 the cable 35 draws the member 19 from the position shown in Fig. 6 to a position wherein the lower end of the member 19 registers with a central section 45 of the tubes 21 and 22 whereby air from the propeller 16 is discharged through the nozzles 46 and 47 on the ends of the tubes 21 and 22 providing a brake to reduce the speed of the aircraft. With the return movement of the foot pedal, which is urged upwardly by a spring 48 the cable 40 is drawn forwardly, returning the member 19 to the position shown in Fig. 6 whereby air from the propeller 16 is discharged into one of the tubes 23 and 24 and ejected through one of the outlets or nozzles 49 or 50.

An auxiliary tubular valve member 51, pivotally mounted on the shaft 52 is positioned to receive air from the member 19 with the member extended rearwardly, as shown in Fig. 6, and, also as shown in Fig. 4, the member 51 is actuated by the steering wheel 27 which is connected to one side of the tubular member 51 by a cable 54 and to the opposite side by a cable 55. The cable 54 is trained over pulleys 56, 57 and 58 on one side of the aircraft and the end is connected to the member 51 at the point 59. The cable 55 is trained over pulleys 60, 61 and 62 and the end is connected to the opposite side of the tube 51 as shown at the point 63. By this means the force of air from the propeller 16 may be directed to the forward end of the aircraft or to the rear or to either corner at the rear, thereby providing steering means for guiding the aircraft to the right or left laterally, or in a circle.

To further facilitate steering and maneuvering the aircraft the nozzles or outlets 49 and 50 are pivotally mounted on horizontal shafts 64 and 65 on the ends of which arms 66 and 67 are positioned and, as illustrated in Figs. 5 and 6 the arms are connected by cables 68 and 69 to center levers 70 and 71 pivotally mounted on brackets 72 and the levers are controlled by rods 73 extended from arms 74 on the lower portion of the steering wheel post 75, the arms being actuated by hand levers 76, similar to gear shift levers on conventional steering wheel posts.

The levers 70 and 71 also control positions of the nozzles or outlets 46 and 47, being connected by cables 77 and 78 to arms 79 and 80 on shafts 81 by which the elements 46 and 47 are pivotally mounted on the leading ends of the tubes 21 and 22.

The opposite ends of the tubes or nozzles are flared, as illustrated in Figs. 1 and 5 and the outer shells in which the nozzle elements are pivotally mounted are provided with springs 82 and 83, at the rear and 84 and 85, at the forward end whereby the nozzles are urged away from the walls of the shell in which the nozzles are mounted. The nozzles 49 and 50 are positioned in shells 86 and the nozzles 46 and 47 are positioned in similar shells 87.

The center section 88 from which the tubes 21 and 22 extend is also provided with springs 89 that urge the member 19 away from the walls and similar springs 90 and 91 are positioned to urge the tubular element 51 away from the walls, as shown in Fig. 7.

From the center section 88 the housing flares outwardly providing a funnel-shaped section 92 that receives air from the propeller 16 at the upper end of the aircraft.

The nozzles or outlets or discharge elements at the ends of the tubes extended from the housing 92 of the propeller 16 may be actuated independently to change the direction of travel of the aircraft, however, as illustrated in Fig. 7, the control levers 70 may be mounted on a common shaft 93 which extends through the machine and which is rotatably mounted in bearings 94, and 95 in the ends of the brackets 72.

The cockpit or cabin in which the seat 26 and steering wheel 27 are positioned is provided with a cowl 96 from which instruments and steering elements may be suspended and a window, such as a windshield 97 is positioned in the line of vision of the operator.

Although the propellers are shown and described as being independently operated, it will be understood that the propellers may be operated by a single engine or motor and the engine or motor may be positioned in the rear of the cockpit or cabin or in such a position that the aircraft is balanced.

With the parts assembled as illustrated and described a device is provided which, by operating the propellers 10 and 11 will travel straight upwardly and which, with the propeller 16 operating may travel upwardly or downwardly in inclined paths or may be turned laterally, as may be desired.

It will be understood that modifications, within the scope of the appended claim, may be made in the design and arrangement of the parts without departing from the spirit of the invention.

What is claimed is:

An aircraft comprising a frame, spaced horizontally disposed lower propellers mounted in the frame, an upper propeller positioned in a plane spaced above the plane in which the lower propellers are positioned, ducts for guiding air from the upper propeller to the rear and forward ends of the frame, said ducts including forwardly and rearwardly discharging outlets on opposite sides of said frame and control means for guiding the air through said ducts, selectively, to the front, rear, and also to opposite sides of the rear portion of the frame.

References Cited in the file of this patent
UNITED STATES PATENTS

| | | |
|---|---|---|
| 1,104,542 | Porter | July 21, 1914 |
| 1,786,576 | Nelson | Dec. 30, 1930 |
| 2,461,435 | Neumann | Feb. 8, 1949 |